Patented Mar. 17, 1936

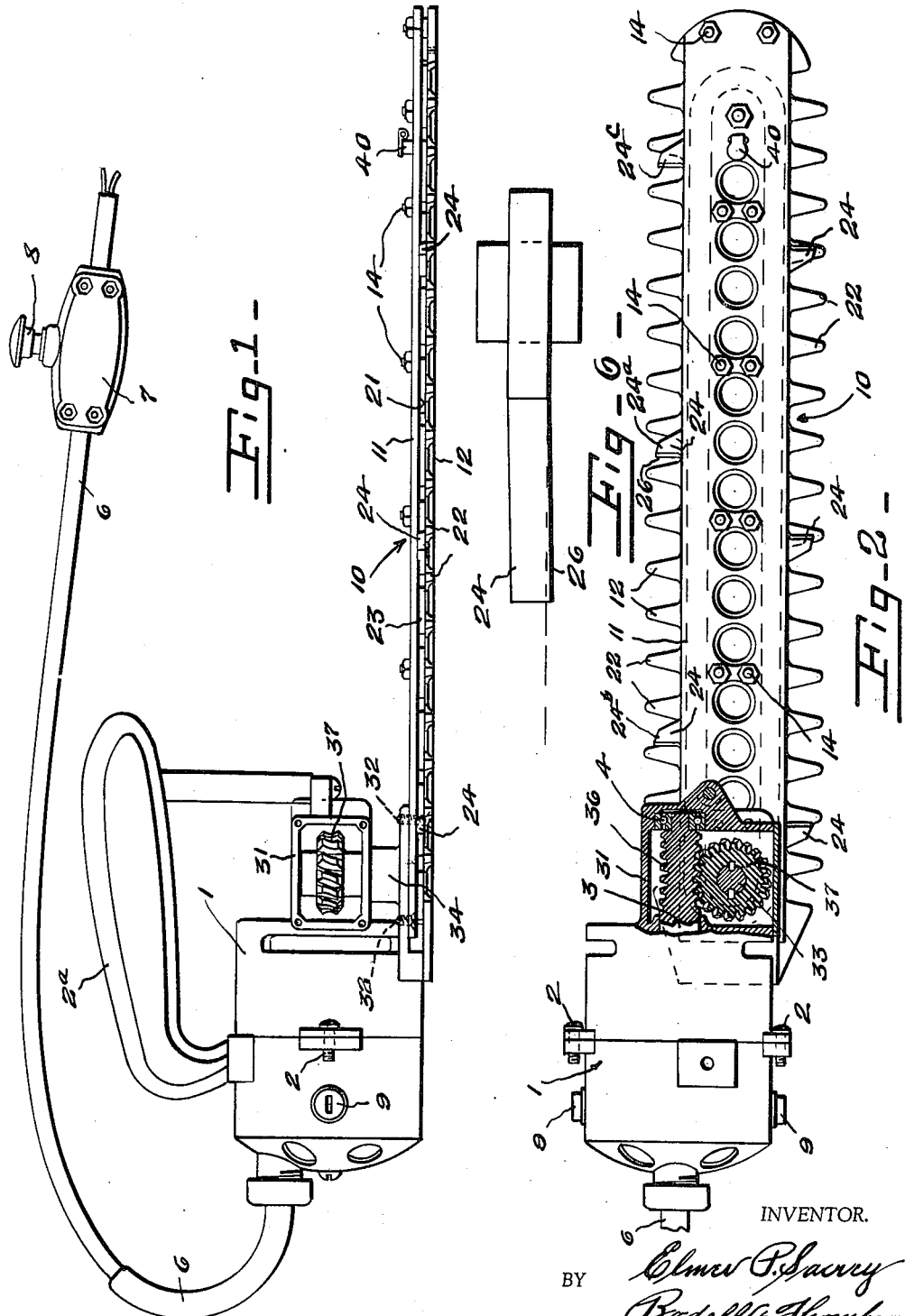
March 17, 1936.　　　　E. P. SACREY　　　　2,034,058
IMPLEMENT FOR TRIMMING HEDGES AND THE LIKE
Filed May 22, 1933　　　2 Sheets-Sheet 1
INVENTOR.
Elmer P. Sacrey
BY
Burdell & Thompson
ATTORNEYS.

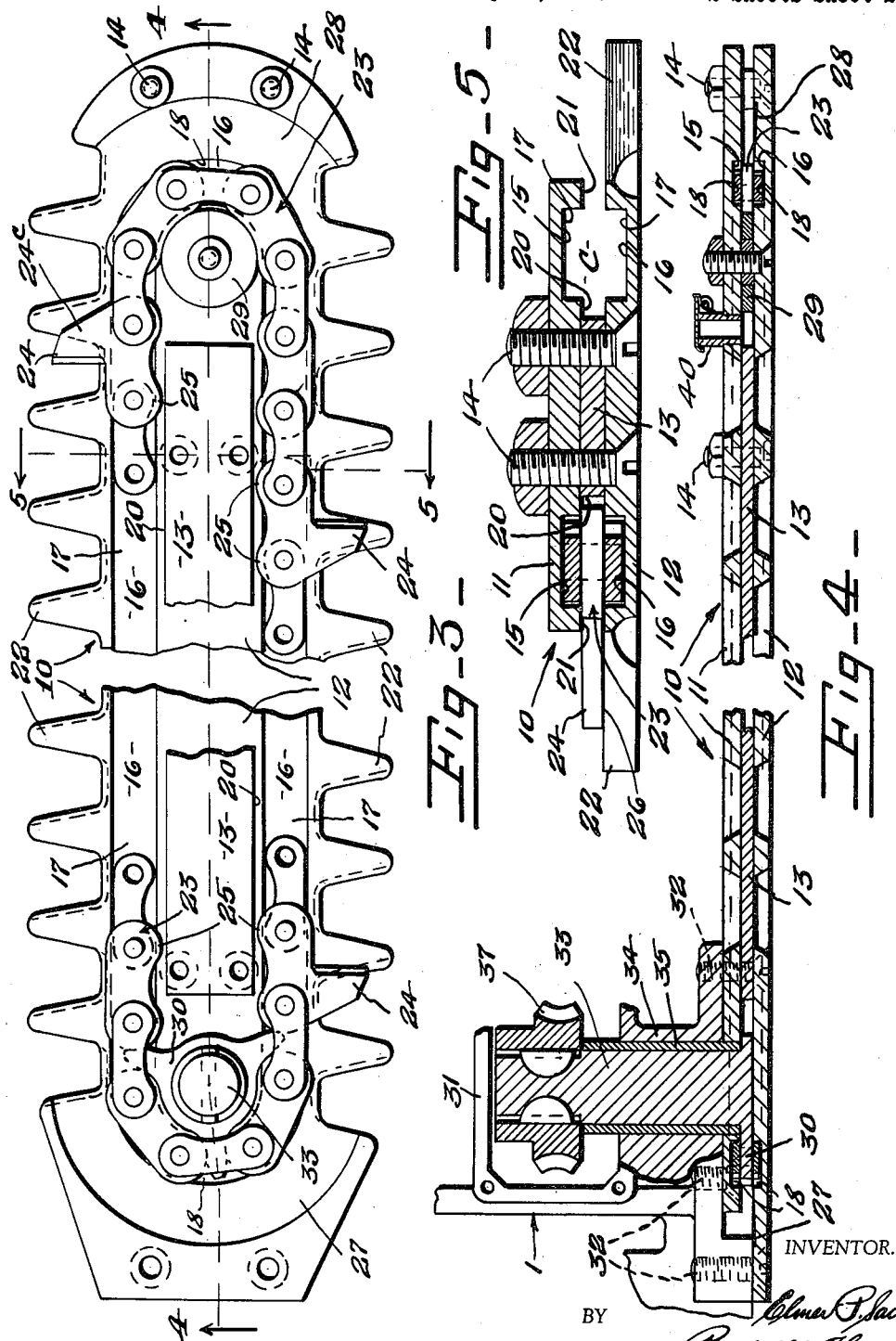

2,034,058

UNITED STATES PATENT OFFICE 2,034,058

IMPLEMENT FOR TRIMMING HEDGES AND THE LIKE

Elmer P. Sacrey, Liverpool, N. Y., assignor to Syracuse Toolectric Mfg. Corp., Syracuse, N. Y., a corporation of New York Application May 22, 1933, Serial No. 672,186

8 Claims. (Cl. 30—11)

This invention has for its object, an implement or power tool for trimming hedges, shrubbery, etc., which is particularly simple and economical in construction, highly efficient and rapid in use.

It further has for its object, a relative arrangement of the motor housing, finger bar and handle, whereby the implement is easily held and manipulated.

It further has for its object, a finger bar assembly consisting of plates, or strips, so assembled as to form guides for a cutter chain, and also a guide for the chain which holds the chain with the cutters thereon substantially rigid, or against looseness.

It further has for its object, a simple assembly of the motion transmitting means between the motor shaft and the chain and of the finger bar assembly, and the motor housing.

The invention consists in the novel features and in the combinations and constructions hereinafter set forth and claimed.

In describing this invention, reference is had to the accompanying drawings in which like characters designate corresponding parts in all the views.

Figure 1 is a side elevation of a tool embodying this invention, the cover plate of the housing for the gearing being removed.

Figure 2 is a plan view, partly in section.

Figure 3 is an enlarged, fragmentary, plan view, partly broken away, of the finger bar assembly, the top plate being removed.

Figures 4 and 5 are sectional views taken respectively on lines 4—4 and 5—5, Fig. 3.

Figure 6 is an enlarged edge view of one of the chain links with the knife.

This tool for trimming hedges, and the like, comprises generally, a body which is the housing for the electric motor for driving the cutter chain, a finger bar assembly projecting from one end of the body and supported therefrom, the finger bar assembly extending parallel to the axial line of the motor shaft at one side of, or below the same, and a handle on the body extending in a general direction parallel to the axial line of the motor shaft and above the same, the finger bar being formed with an internal guide channel having a slot opening through the edge of the finger bar assembly over the fingers, and also a groove in the rear wall of the channel opposite to or alined with the slot; an endless chain movable in the groove, some of the links of the chain having laterally extending knives extending through the slot, and also a shoulder movable in the groove, and motion transmitting means between the motor shaft and the adjacent end of the chain.

1 designates the body, or casing, of the electric motor, this being of any suitable form, size and construction, and is usually formed of front and rear sections suitably clamped together as by screws 2, this being for the purpose of readily assembling the motor therein. 2a designates a handle carried by the body and extending above and lengthwise of the axial line of the motor shaft and parallel to the finger bar.

3 designates the motor shaft which extends lengthwise of the casing, and is journalled at its outer end in a bearing 4 at the front side of a housing for the transmission gearing.

The electric current is supplied to the motor through a suitable cable 6 having a switch 7, of any suitable construction, including a handle, or button 8, which must be continually held depressed, to hold the switch closed, so that when the operator releases the button or handle 8, the switch opens and the motor stops. Thus, the operator must have both hands occupied while the tool is running.

9 designates the brush holders of the motor, these extending out through the periphery of the casing where they are accessible.

10 designates the finger bar assembly, this extending below and parallel to the axial line of the motor shaft and being formed of upper and lower plates 11 and 12, and a spacer strip or plate 13 between them, the plates being held together at intervals by suitable means as screw bolts 14. The plates 11 and 12 are provided respectively with grooves 15 and 16 in their opposing faces near the margins thereof, these grooves including lengthwise portions 17 and arcuate portions 18 connecting the ends of the lengthwise portions so that the grooves are continuous. The spacer 13 is located between the lengthwise portions of the grooves, and is of less width than the distance between the lengthwise or side portions of the grooves, and located centrally between the grooves thereby providing a groove 20 at the inner sides of the grooves 15 and 16. The spacer also forms a slot 21 opening from the channel formed by the grooves 15, 16, through the edge of the finger bar assembly, over the fingers 22 provided on the lower strip or plate 12. The plates 11, 12 may be formed with perforations throughout their length to lighten them.

23 designates the cutter chain guided in the channel C formed by the grooves 15, 16, 20, and some of the links having angularly extending knives 24 extending through the slot 21, over the fingers 22, to coact therewith. This chain consists of double links spaced apart, and single links connecting the double links, with their ends extending between the members of the double links and pivoted thereto in any suitable manner, as by rivets, and the knives extend laterally from the single links.

The parts of the double links are guided by the grooves 15 and 16, while the single links are alined with the slot 21 and groove 20, and projecting portions 25 on the inner side of the single links at the ends thereof adjacent the pivots also run in the groove 20. This assembly of chain in a channel holds the knives in alinement, or holds them against or from tilting away from or from being pried away from the bar 11 or the fingers 22 thereof, and makes them capable of standing hard use. The knives are spaced apart as seen in Figure 2 so that when one knife as 24a is cutting another knife 24b is just leaving cutting position, and a third knife 24c is just coming into cutting position. This arrangement avoids overloading and stalling of the motor, and also keeps the load substantially uniform. The knife is double edged, so that both edges can be used, although but one edge is in use at any one time.

As seen in Figure 6, the cutting edge of the knife is in the form of a lip 26 extending below the plane of the lower face of the knife and the path of the knives 27 and 28 at the inner and outer ends of the lower plate 12 is complementally formed so that in operation, the knives are self sharpened both on the finger bars and on the surfaces 27 and 28.

In addition to the arcuate portion 18 at the outer end of the finger bar, the chain is guided by a hardened washer 29 located between the outer ends of the bars 11 and 12, or just beyond the end of the spacing bar 13. The rear loop of the chain is, in addition to the arcuate portion 18, guided by a sprocket wheel 30.

The motion transmitting means between the motor shaft 3 and the chain includes the sprocket wheel 30 and gearing between it and the motor shaft, this gearing being located in the motor housing, or an extension 31 thereof. The finger bar assembly 10, or the upper and lower plates 11 and 12 thereof, lap the body or motor housing on the under side thereof, and the plates are secured to the motor housing, or body 1, in any suitable manner, as by screws 32. The sprocket wheel 30 is located between the portions of the plates 11 and 12, which lap the body 1, and the lower face thereof thrusts on the upper face of the plate 12. The sprocket wheel is provided with a stem 33 extending through the upper plate 11 and a bearing 34 formed integral with the housing 31, or a bushing 35 in said bearing. The motion transmitting means between the motor shaft and the stem 33 of the sprocket wheel, comprises a worm 36 provided in any suitable manner on the motor shaft 3, and a worm wheel 37 keyed on the upper end of the stem 33 and meshing with the worm 36. The worm wheel 37 thrusts against the upper end of the bushing 35. Both the upper end of the stem, and the worm wheel are unprovided with bearings, or are free of the housing 31, they being opposed to the top wall of the housing 31. A suitable oil cup 40 may be provided for supplying lubricant to the channel C.

By reason of the construction of the finger bar, and the assembly of the parts of the finger bar, and the assembly of the finger bar to the motor housing, and also the assembly of the sprocket wheel and gearing, the implement is especially economical in construction, durable in use and the chain, and its motion transmitting mechanism guided and held against looseness. Owing to the relative arrangement of the handle 2a, the body and the finger bar, the tool is readily held and manifolded and balances in the hand of the operator.

In operation, the operator holds the tool by means of the handle 2a with one hand, and holds the switch operating member 8 depressed with the other hand, whereupon the chain is actuated at great speed and either one side, or the other, of the double edged bar can be moved into the work, as a hedge, and rapidly moved along trimming or cutting the hedge, shrubbery, and the like, very quickly and accurately. The tool is readily manipulated into different angles horizontal or vertical, and swung in either direction into the work, and owing to the relative arrangement of the handle body and finger bar, the implement balances in all positions and is easily manipulated.

What I claim is:

1. A power operated hedge trimmer comprising a motor casing constituting the body of the trimmer, a finger bar extending from the body in front of the body below and parallel to the axial line of the motor shaft, a handle carried by the body, the inner end of the finger bar lapping the body, a cutter consisting of an endless chain carried by the finger bar and having loops at opposite ends of the finger bar, the finger bar having guide means for the chain, motion transmitting means in the body between the motor shaft and the chain including a sprocket wheel coacting with the loop of the chain at the inner end of the bar and thrusting against the portion of the bar lapping the housing, the sprocket wheel having a stem journalled in the housing, and connections in the housing between the stem and the motor shaft.

2. A power operated hedge trimmer comprising a motor casing constituting the body of the trimmer, a finger bar extending from the body at one side of the axial line of the motor shaft and having an endless cutter chain movable along the finger bar and coacting therewith and having loops at opposite ends of the bar, the bar at one end lapping the casing, the motor shaft having a worm thereon, a sprocket wheel coacting with the loop of the chain at the inner end of the bar where it laps the casing, the sprocket wheel thrusting against the bar and having a stem journalled in a bearing in the casing, a worm wheel meshing with the worm and mounted on said stem and thrusting at one end against the end of the inner bearing for the sprocket wheel stem and at its other end against a wall of the casing.

3. A power operated hedge trimmer comprising a body, a finger bar extending from one end of the body and formed with an internal guide channel having side portions extending along the lengthwise edge of the bar and rounding arcuate portions connecting the ends of the side portions, the bar being also provided with a slot opening through its lengthwise edges and ends, the slot opening into the outer side of the guide channel, the finger bar being also formed with a groove opening into the channel and alined with the slot, an endless chain slidably fitting the channel, some of the links of the chain having knives angular therewith and extending through the slot with the fingers of the bar and some of the links having shoulders movable in said groove, a motor carried by the body and motion transmitting means between the motor shaft and the chain, said motion transmitting means being carried by the body.

4. A power operated hedge trimmer comprising a body, a finger bar projecting from the body and secured thereto, said bar comprising upper and lower plates formed with grooves in their opposing faces including side portions extending along the opposite lengthwise edges of the plates and arcuate portions connecting the ends of the side portions, a spacer between the plates, the grooves and spacer forming a guide channel and a slot opening from the channel through the side and end edges of the finger bar, the spacer being of less width than the distance between the grooves thereby forming a groove opening into the channel, and located opposite the slot, a chain slidably fitting the channel and having knives extending through the slot and also shoulders slidable in the groove opposite the slot, and motor means carried by the body for actuating the chain in the channel.

5. A power operated hedge trimmer, of the type described, comprising a body, a finger bar projecting from the body, said finger bar comprising upper and lower plates formed with complemental endless grooves in their opposing faces, said grooves comprising comparatively straight portions extending adjacent each side edge of the finger bar and being connected together at each end by arcuate portions, a spacer arranged between the plates and being of less width than the distance between the inner walls of the straight grooves, a cutter consisting of an endless chain, certain of the links of said chain slidably fitting and traveling in the grooves in the plates, and other links being wider than said grooves and slidably fitting and traveling between the plates, certain of said last mentioned other links being provided with knives extending outwardly between the plates in cutting relationship to the fingers of the finger bar, a motor carried by the body, and motion transmitting means connecting the motor and the chain.

6. A power operated hedge trimmer, of the type described, comprising a body, a finger bar projecting from the body, said finger bar comprising upper and lower plates, said plates being formed with complemental endless grooves in their opposing faces, said grooves comprising comparatively straight portions extending adjacent each side edge of the bar, said straight portions being connected at their ends by arcuate portions, said plates being arranged in spaced apart relationship, a cutter including an endless chain provided with cutter links having teeth extending outwardly between the plates in cutting relationship to the fingers of the finger bar, and having connecting links, said cutter links being slidable between the plates and being supported thereby on each side by said grooves, and the connecting links being slidable in said grooves, a motor carried by the body, and motion transmitting means between the body and the chain.

7. A power operated hedge trimmer of the type described, comprising a body, a finger bar detachably secured to the body and extending outwardly from one end thereof and being provided with a plurality of fingers extending outwardly from each lateral edge, said finger bar being also provided with an internal endless guide channel, and with a slot extending inwardly from each lateral edge of the bar and communicating with said guide channel, and endless chain slidably fitting said channel and including a plurality of cutting knives extending outwardly through said slot over the fingers of the finger bar, means carried by said finger bar for effecting movement of the chain through said guide channel, a motor mounted in the body, motion transmitting means between the motor shaft and the chain actuating means, said finger bar including means cooperable with said cutting knives to maintain the latter in contact with the upper surface of said fingers throughout their length.

8. A power operated hedge trimmer of the type described, comprising a body, a finger bar projecting from one end of the body and being formed with a plurality of fingers extending outwardly from the edge of said bar, said finger bar being also provided with an endless internal guide channel and a slot extending inwardly from the edge of the bar through said guide channel and terminating beyond the inner wall of said channel, an endless cutter chain slidably fitting said channel and including cutting knives slidably fitting said slot, the cutting portion of said knives extending outwardly through said slot over the fingers of the finger bar and the inner edges of said knives sliding in the inner portion of said slot, means carried by said finger bar for actuating the chain through said guide channel, a motor carried by the body, and motion transmitting means between the motor shaft and the chain actuating means.

ELMER P. SACREY.